No. 805,063. PATENTED NOV. 21, 1905.
J. G. HIRSCH.
MACHINE FOR PLANTING AND FERTILIZING POTATOES.
APPLICATION FILED MAY 23, 1904.

3 SHEETS—SHEET 1.

Witnesses.
C. H. Keaney.
Anna F. Schmidtbauer.

Inventor.
John G. Hirsch
by
Benedict & Morsell
Attorneys.

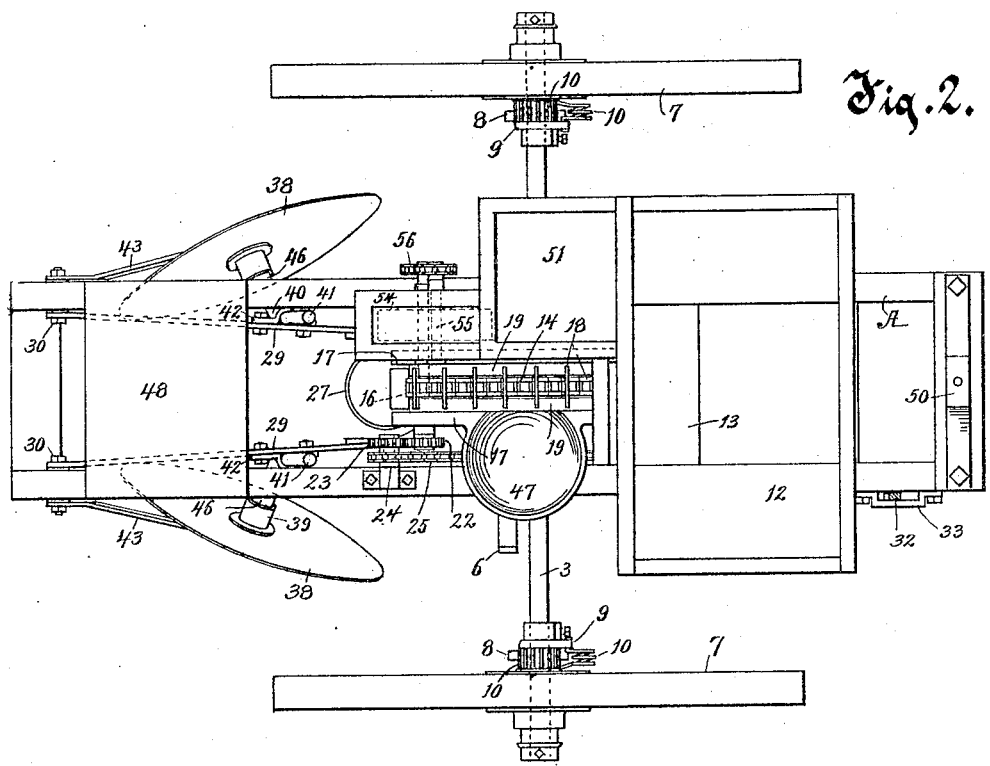

UNITED STATES PATENT OFFICE.

JOHN G. HIRSCH, OF MILWAUKEE, WISCONSIN.

MACHINE FOR PLANTING AND FERTILIZING POTATOES.

No. 805,063.     Specification of Letters Patent.     Patented Nov. 21, 1905.

Application filed May 23, 1904. Serial No. 209,163.

*To all whom it may concern:*

Be it known that I, JOHN G. HIRSCH, residing in Milwaukee, in the county of Milwaukee and State of Wisconsin, have invented new and useful Improvements in Machines for Planting and Fertilizing Potatoes, of which the following is a description, reference being had to the accompanying drawings, which are a part of this specification.

The object of my invention is to provide a better organized and a more capable, easily-operated, and efficient machine for planting and fertilizing potatoes than has heretofore been known.

The invention consists of the improved machine, its parts and combinations of parts, as herein described and claimed, or the equivalents thereof.

Figure 1:
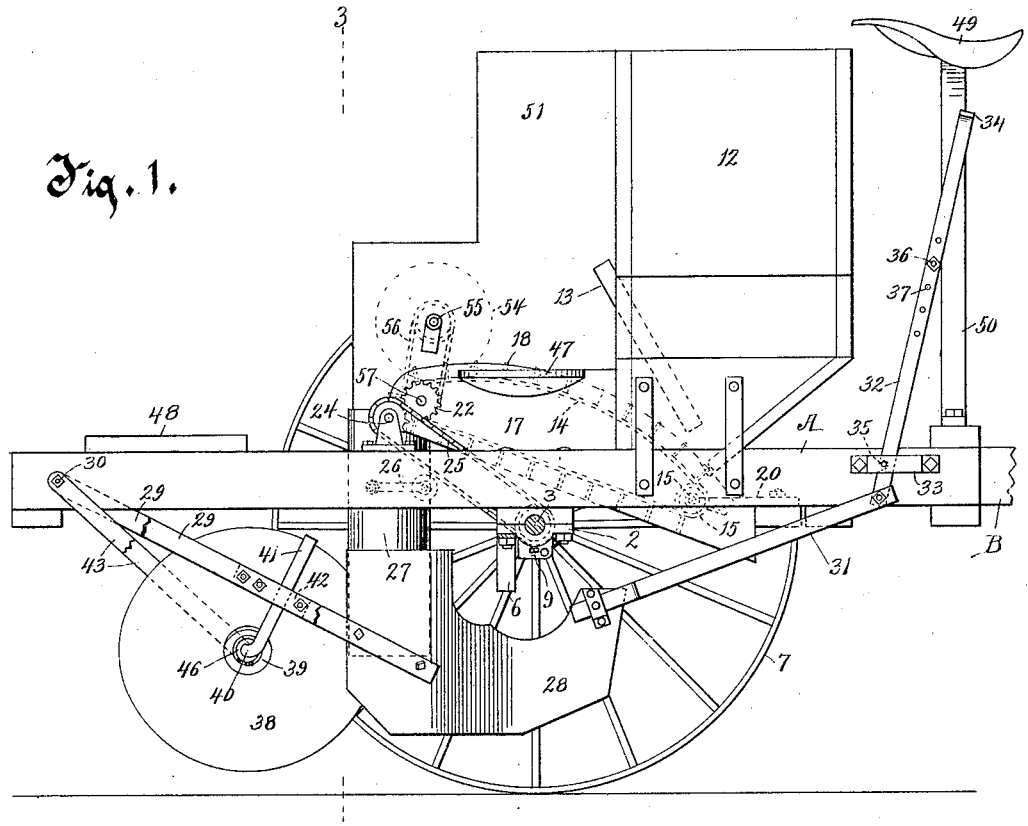
Figure 4:
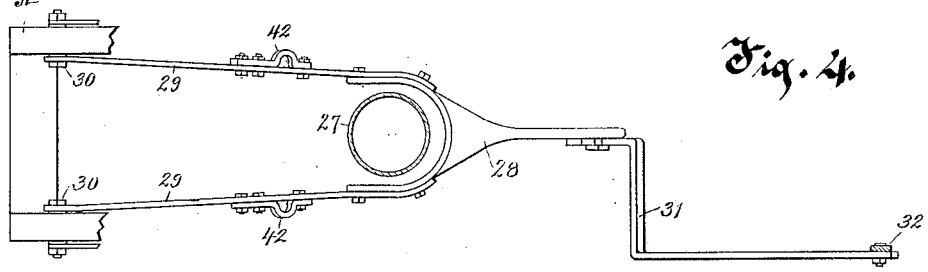
Figure 5:
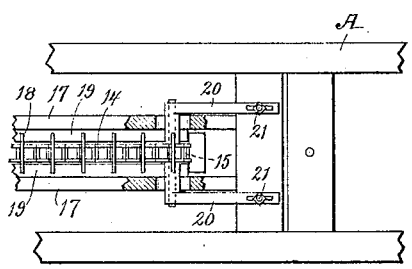
Figure 3:
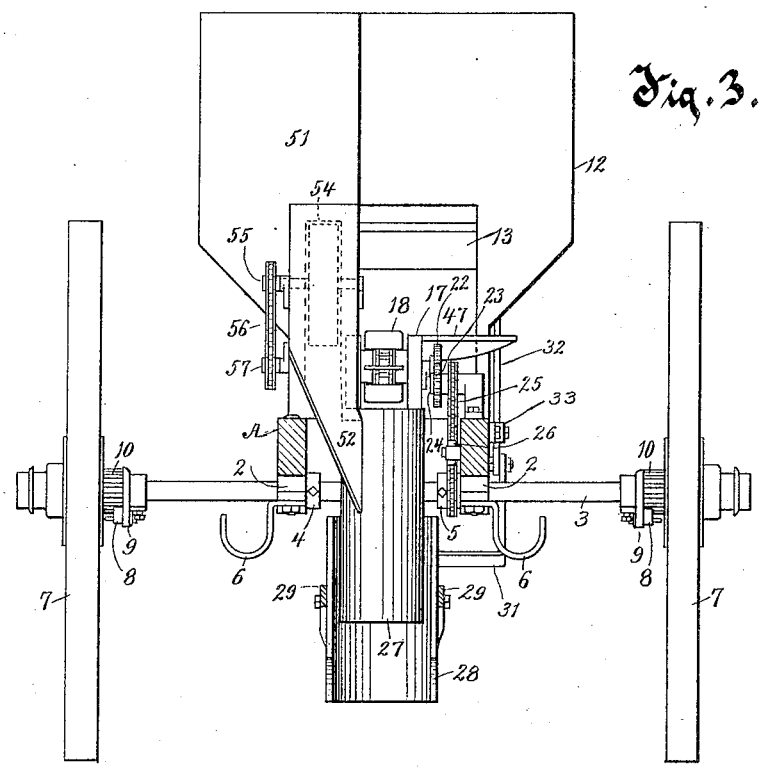
Figure 6:
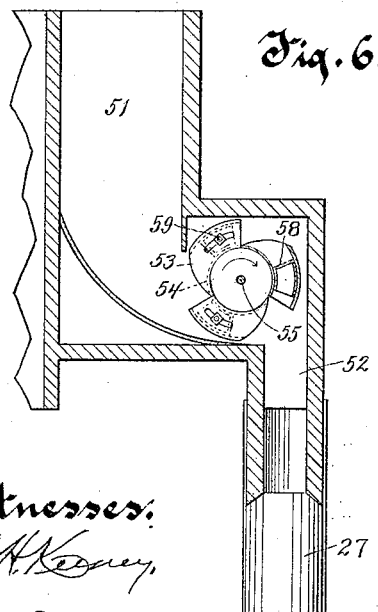
Figure 7:
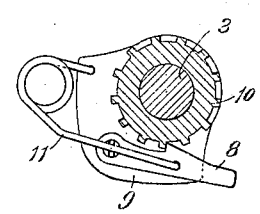

In the drawings, Figure 1 is an elevation at one side of my improved machine, parts being broken away for convenience of illustration. Fig. 2 is a top plan view of my improved machine, the driver's seat being omitted and the plow-adjusting rod being shown in cross-section. Fig. 3 is a vertical section of the machine on line 3 3 of Fig. 1 looking at the front portion of the machine from the rear. Fig. 4 is a plan of the furrow-making plow and connections, the tubular potato and fertilizer chute being in section. Fig. 5 is a detail of the endless-chain potato-feeder and means for adjusting its tension. Fig. 6 is a vertical section of the hopper for holding fertilizer and means for feeding it in suitable quantities to the chute. Fig. 7 is a detail of means for putting the wheels of the machine into engagement with the axle and releasing them therefrom, and Fig. 8 is a section of one of the covering disks or shovels with sand-excluding hub.

In the drawings, A represents a frame for my improved machine, which frame is advisably elongated toward the front and rear and is of rectangular form, being otherwise of any suitable size, proportions, and material to adapt it for mounting it on traction-wheels and for carrying the other parts of the machine. The frame is provided with a tongue B for attaching a team thereto for hauling the machine along.

The frame A is provided with axle-boxes 2 at each side thereof on the under sides of the longitudinally-disposed side rails of the frame, in which the axle 3 has its bearings and is adapted to rotate. The axle is held against movement endwise in the axle-boxes by a collar 4 at one side and the hub 5 of a sprocket-wheel on the other side, which collar and hub bear, respectively, at the inner side against the axle-boxes. Stirrups 6 6, one at each side of the frame, are secured thereto conveniently by the axle-box bolts and depend therefrom, projecting laterally beyond the vertical planes of the side rails of the frame. The hopper-frame is comparatively narrow, and the axle 3 projects laterally beyond the frame at each side thereof for a little distance, and wheels 7 7 are mounted and rotate on the axle at the respective ends thereof. The wheels are normally in engagement with the axle, so as to rotate therewith when the machine is drawn ahead, each wheel being clutched thereto by a catch or pawl 8, pivoted on a collar 9, fixed on the axle, the catch being adapted to engage with the teeth of a spur-toothed wheel 10, fixed on the hub of each wheel 7. The catch 8 is held releasably in engagement with the wheel 10 by a spring 11, formed of wire, one end of which is secured to the collar 9 and the other end of which is secured to the catch 8. When the machine or one end of the axle 3 is moved backward, the wheel can rotate independently of the axle, the teeth of the cog-wheel 10 being adapted to slip past the catch 8.

A potato-holding hopper 12 is mounted in upright position on the frame A near the axle 3 and is of such size as to adapt it to hold a considerable supply of potatoes, half-potatoes, or spuds for planting. The hopper preferably is made so wide as to extend laterally beyond the sides of the frame A; but near the bottom the walls of the hopper are inclined inwardly downwardly at the sides, as well as at the front, and an adjustable gate 13 is fitted and made slidable in the rear wall of the hopper, extending therefrom inwardly downwardly opposite the front inclined wall of the hopper in such manner as to close the throat of the hopper to such extent as is desired, thereby preventing the potatoes in the hopper from lying or bearing directly on the feeder, hereinafter described, except only that limited supply of the potatoes that is being fed by the inclination of the walls of the hopper onto the feeder. Just below and at the rear of the throat of the hopper there is an endless-chain potato-feeder 14, consisting of suitable flat chain-links hinged together and mounted at one end on the idle roller 15, having its bearings in the frame A and at the other end on the driven roller 16, mounted in side pieces or blocks 17 17, fixed on the frame.

The chain 14 is provided with a series of blades 18 at a little distance from each other, each of which may consist of an outwardly and laterally extending strip of metal secured to a link of the chain. Advisably one blade is secured to each link of the chain. The lateral extremities or projections of these blades 18 along the upper course of the endless chain, and through which it moves rearwardly, are made to ride on the edges of ways 19 19, fixed on the side pieces 17 17, and which may be curved slightly upwardly, as best shown in Fig. 1. The side pieces 17 17 serve for potato-retaining side walls at each side of and alongside the endless chain or of the spaces between the blades 18 on the chain from the throat of the hopper to the point of the discharge of the potatoes from the endless-chain feeder. At its lower front end the idle roller 15, on which the endless chain 14 is mounted, has its axle-bearings in arms 20 20, which arms are supported and made adjustable on the frame by bolts 21 21 through elongated slots therefor in the arms and held in the frame. Portions of the arms 20 in which the axle or journals of the idle roller 15 are mounted project through the side pieces 17 17 in slots therefor elongated in the general direction of the length of the chain feeder. By this means the tension of the chain can be regulated. The driven roller 16 is provided with a toothed wheel 22, that meshes with a toothed wheel 23, mounted on a stud-pin 24, fixed on the frame. The hub of the toothed wheel 23 is provided with a sprocket-wheel on which the sprocket-chain 25 runs, which chain also runs on a sprocket-wheel rigid with hub 5, secured rotatively to and with the axle 3. A belt-tightening device 26, mounted on the frame, may be employed for regulating the tension of the sprocket-chain 25.

Just below the rear end of the chain feeder 14 and adapted to receive the potatoes dropped therefrom as the chain turns its direction there is a vertically-disposed tubular chute 27, secured rigidly to the frame. About and extending below the lower end of the chute 27 and projecting forwardly therefrom there is a plow or furrow-cutter 28, which is mounted on the frame adjustable vertically by means of arms 29 29, secured rigidly to the rear portion of the plow and extending upwardly and rearwardly therefrom to the frame A, to which the arms are pivoted by bolts 30 30. The rear portion of this plow loosely incloses the lateral sides and front of the tubular chute 27 near its lower end, being open at the bottom, and converges toward the front into a thin blade-like form adapted to enter and cut the ground, and this front portion of the plow is provided with a rigid laterally-bent and forwardly-projecting arm 31, which at its front end is pivoted to a rod 32, conveniently made of strap-iron, which rod extends upwardly loosely through a clip 33, secured to the frame, and is adjustably overturned at the top, forming a handle 34, adapted to be grasped by the driver for raising or lowering the plow. Near its lower end the rod 32 is provided with a recess forming a tooth 35, which is adapted to engage a pin extending through the clip 33 into the frame. When the tooth 35 is in engagement with the pin in the clip 33, the plow is held in a raised position, as shown in Fig. 1. On releasing the tooth 35 from the clip 33 the plow drops down, so as to enter the ground, the extent to which the plow is permitted to go down being limited by a stop 36 on the rod 32, which stop engages the clip 33. The stop 36 is made adjustable either up or down in the rod 32, the stop being conveniently a short bolt inserted in the rod through any one of several holes 37 provided therefor. By this construction the plow 28 can be raised so as to be above and free from the ground, substantially in the position shown in Fig. 1, when the machine is to be hauled along, not being in use for planting potatoes, or can be let down when to be used in planting potatoes, so as to enter and cut a furrow in the ground to receive therein the potatoes and fertilizing material.

A little at the rear of the plow 28 there are shovels 38 38, adapted for throwing earth back into the furrow formed by the plow 28, and thereby covering the potatoes and the fertilizer that has been dropped in the furrow. These shovels are advisably made of sheet metal in circular form and dished, each shovel being provided with a hub 39, fitted and rotatable on an axle 40, which axle extends for some distance on the inner or dished side of the shovel in a straight line and then bends upwardly, forming the axle-tang 41, which tang passes through a clip 42, fixed on the arm 29 and adjustable vertically therein, the clip being secured to the arm 29 by bolts, by means of which the tang is gripped to the arm when adjusted up or down relative thereto. The outer end of each axle 40 is inserted in an arm 43, pivoted at its other extremity to the frame concentrically with the arm 29. A collar 44 on the outer end of the axle 40 and secured thereto by a set-screw holds the parts in position with relation to each other. At its inner end the hub 39 is projected inwardly, forming a sleeve or box 45, which fits revolubly but closely about a sleeve-bearing 46 on and about the axle 40 and held in place thereon by a set-screw. By this construction a dirt-excluding box and connection is formed on the inside of the disk shovel 38, adapted to prevent dirt or foreign matter carried up by the rotation of the shovel from getting into the bearing on its axle when the dirt or foreign matter drops from the disk at or near its upper edge. The axle 40 is by means of the angle formed between the axle 40 and its tang 41 and the method of mounting it on the frame so disposed that the disk shovel 38 is in an oblique plane with reference to the perpendicular, the two shovels being disposed generally in planes diverging laterally from each other toward the front and outwardly from each other upwardly.

A shallow pan 47 is fixed on the frame conveniently by being secured to one of the side pieces 17 and is located alongside the route of the chain potato-feeder 14. At a little distance to the rear of the potato-feeder and the chute 27 a seat 48 is provided, which may consist of a board placed transversely on and secured to the frame A. This seat furnishes a support for an attendant, who can place his feet in the stirrups 6 6, whereby he sits on the machine facing the front, but at a considerable distance at the rear of the axle 3, while a seat 49 for the driver of the team is mounted on a standard 50, fixed on the frame at a distance in front of the axle 3 substantially equal to the distance at which the seat 48 is placed at the rear of the axle. By thus arranging the seat of the driver and of the attendant a balance of the frame is secured on the axle 3. The attendant seated on the seat 48, facing the front, watches the chain feeder 14, and if more potatoes or spuds are dropped through the chute 27 into any one of the spaces or pockets formed by the blades 18 on the chain feeder than is desired to be dropped at one point in the furrow he removes the excess potato, potatoes, or spuds from the feeder and places them temporarily in the pan 47, and if at any time any one of the pockets or spaces on the feeder between the blades does not receive a potato or spud the attendant takes a potato or spud from the pan 47 and puts it into such unoccupied pocket on the feeder. The arrangement of the machine by which the attendant rides with his face toward the front obviates seasickness or any unpleasant sensations to the attendant which he might have by reason of being compelled to ride backward, as is the case on some machines.

It is frequently desirable to drop fertilizing material into the open furrow with the potatoes before the furrow is closed and the potatoes covered, and I provide a hopper 51 just at the rear and alongside of the hopper 12 for receiving, holding, and discharging fertilizing material, which hopper is provided at its lower end with a laterally-disposed passage terminating in a downwardly-extending throat 52, which leads and discharges laterally into the chute 27. In the lateral passage at the lower end of the hopper 51 I provide a series of buckets 53, mounted in circumferential series on a drum 54, fixed on a shaft 55, mounted and rotatable in the walls of the hopper. The shaft 55 is furnished with a sprocket-wheel, and a sprocket-chain 56 runs on this sprocket-wheel and also on a sprocket-wheel on the shaft 57 of the roller 16. By this means the buckets 53 are made to rotate in unison with the movement of the chain feeder 14. Each of the buckets 53 is provided with a movable box-like telescoping tubular wall 58, which is adjustable in the bucket 53 toward and beyond its open end circumferentially by means of a bolt 59 passing through a slot in the side of the bucket and entering the side wall of the box-like bottom. By this adjustable tubular wall in each bucket the bucket can be arranged to scoop up an increased amount of the fertilizer from the supply in the hopper 51 and carry it upwardly and over to the throat 52 and discharge it downwardly therein as the bucket is revolved on the shaft 55.

The wheels 7 are mounted on the axle 3 so as to be adjustable along on the axle endwise thereof to adapt them to a narrower or wider track, as desired; but this is a feature in common use.

What I claim as my invention is—

1. In a machine of the character described, a frame, an upright fertilizer-holding hopper having a laterally-disposed discharging-throat at its lower end, a vertically-disposed chute into which the throat is adapted to discharge, a horizontal drum rotatable in the throat, buckets fixed on the periphery of the drum disposed to dip into the fertilizer material and carry a portion of it with and over the top of the drum and drop it into the chute, and box-like telescoping tubular walls adjustable extensibly within the buckets adapted to increase the capacity of the buckets beyond the normal amount.

2. In a machine of the character described, a frame, an upright fertilizer-holding hopper having a laterally-disposed discharging-throat at its lower end, a vertically-disposed chute into which the throat is adapted to discharge, a horizontal drum rotatable in the throat, buckets fixed on the periphery of the drum disposed to dip into the fertilizer material and carry a portion of it with and over the top of the drum and drop it into the chute, a drum-shaft, a sprocket-wheel on the drum-shaft, a driving-chain running on the sprocket-wheel and on a related wheel whereby the drum and its buckets are made to drop fertilizing material relatively to seed deposited by the mechanism of said related wheel.

In testimony whereof I affix my signature in presence of two witnesses.

JOHN G. HIRSCH.

Witnesses:
C. T. BENEDICT,
ANNA F. SCHMIDTBAUER.